(12) United States Patent
Nonnet et al.

(10) Patent No.: US 8,614,001 B2
(45) Date of Patent: Dec. 24, 2013

(54) SINTERED PRODUCT BASED ON ALUMINA AND ZIRCONIA

(75) Inventors: Emmanuel P. M. Nonnet, Sarrians (FR); Yves M. L. Boussant Roux, Montfavet (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 33 days.

(21) Appl. No.: 13/322,502

(22) PCT Filed: Jun. 1, 2010

(86) PCT No.: PCT/IB2010/052447
§ 371 (c)(1),
(2), (4) Date: Dec. 14, 2011

(87) PCT Pub. No.: WO2010/140121
PCT Pub. Date: Dec. 9, 2010

(65) Prior Publication Data
US 2012/0082849 A1  Apr. 5, 2012

(30) Foreign Application Priority Data
Jun. 3, 2009 (FR) .................... 09 53667

(51) Int. Cl.
| | |
|---|---|
| *B32B 5/16* | (2006.01) |
| *C04B 35/01* | (2006.01) |
| *C04B 35/10* | (2006.01) |
| *C04B 35/106* | (2006.01) |
| *C04B 35/48* | (2006.01) |
| *C04B 35/488* | (2006.01) |

(52) U.S. Cl.
USPC ........... 428/402; 428/701; 501/134; 501/135; 501/152; 501/153

(58) Field of Classification Search
USPC ........... 501/134, 135, 152, 153; 428/402, 701
See application file for complete search history.

(56) References Cited

U.S. PATENT DOCUMENTS

| | | | |
|---|---|---|---|
| 4,063,856 A | 12/1977 | Dziedzic | |
| 4,316,964 A | 2/1982 | Lange | |

(Continued)

FOREIGN PATENT DOCUMENTS

| | | |
|---|---|---|
| AU | B-62136/86 | 3/1988 |
| FR | 2 579 199 A1 | 9/1986 |

(Continued)

OTHER PUBLICATIONS

Mendelson, M. I., "Average Grain Size in Polycrystalline Ceramics," *Journal of the American Ceramic Society*, Nov. 2, 1967, pp. 443-446, vol. 52, No. 8.

(Continued)

*Primary Examiner* — Hoa (Holly) Le
(74) *Attorney, Agent, or Firm* — Oliff and Berridge, PLC

(57) ABSTRACT

A sintered particle has the following chemical analysis, as percentages by weight: $ZrO_2$ partially stabilized with $CeO_2$ and $Y_2O_3$: complement to 100%; $Al_2$ 10%-60%; additive selected from CaO, a manganese oxide, $La_2O_3$, SrO, BaO, and mixtures thereof: 0.2%-6; the quantity of CaO being less than 2%; impurities: <2%; the zirconia being stabilized with $CeO_2$ and $Y_2O_3$ present in quantities such that, as molar percentages based on the sum of $ZrO_2$, $CeO_2$ and $Y_2O_3$: $CeO_2$: 6 mol %-11 mol %; and $Y_2O_3$: 0.5 mol %-2 mol %; the particle being obtained by sintering at a sintering temperature higher than 1300° C., the sintering temperature being higher than 1400° C. if the additive is CaO or if the molar $CeO_2$ content is in the range 10% to 11%.

23 Claims, 1 Drawing Sheet

(56) References Cited

U.S. PATENT DOCUMENTS

| | | | |
|---|---|---|---|
| 4,820,666 A * | 4/1989 | Hirano et al. | 501/104 |
| 5,466,400 A | 11/1995 | Pujari et al. | |
| 5,728,636 A * | 3/1998 | Nawa et al. | 501/105 |
| 5,854,158 A * | 12/1998 | Nawa et al. | 501/104 |
| 6,069,103 A * | 5/2000 | Kwon | 501/103 |
| 6,893,993 B1 * | 5/2005 | Alexandrov | 501/103 |
| 7,056,851 B2 * | 6/2006 | Nawa | 501/105 |
| 2003/0126804 A1 * | 7/2003 | Rosenflanz et al. | 51/307 |
| 2009/0036291 A1 | 2/2009 | Farber et al. | |
| 2009/0120010 A1 * | 5/2009 | Nonnet et al. | 51/307 |

FOREIGN PATENT DOCUMENTS

| | | |
|---|---|---|
| FR | 2 842 438 A1 | 1/2004 |
| JP | A-64-83566 | 3/1989 |
| JP | A-6-183833 | 7/1994 |
| WO | WO 2008/040813 A1 | 4/2008 |
| WO | WO 2009/018024 A1 | 2/2009 |

OTHER PUBLICATIONS

Brunauer, S. et al., "Adsorption of Gases in Multimolecular Layers," *Journal of the American Chemical Society*, Feb. 1938, pp. 309-319, vol. 60.

International Search Report issued in International Application No. PCTAB2010/052447 on Jul. 29, 2010 (with translation).

Written Opinion of the International Searching Authority issued in International Application No. PCT/I132010/052447 on Jul. 29, 2010 (with translation).

Cutler et al., "Damage-Resistant SrO-Doped Ce-TZP/$Al_2O_3$," *Materials & Design*, vol. 15, No. 3, pp. 123-33, 1994.

* cited by examiner

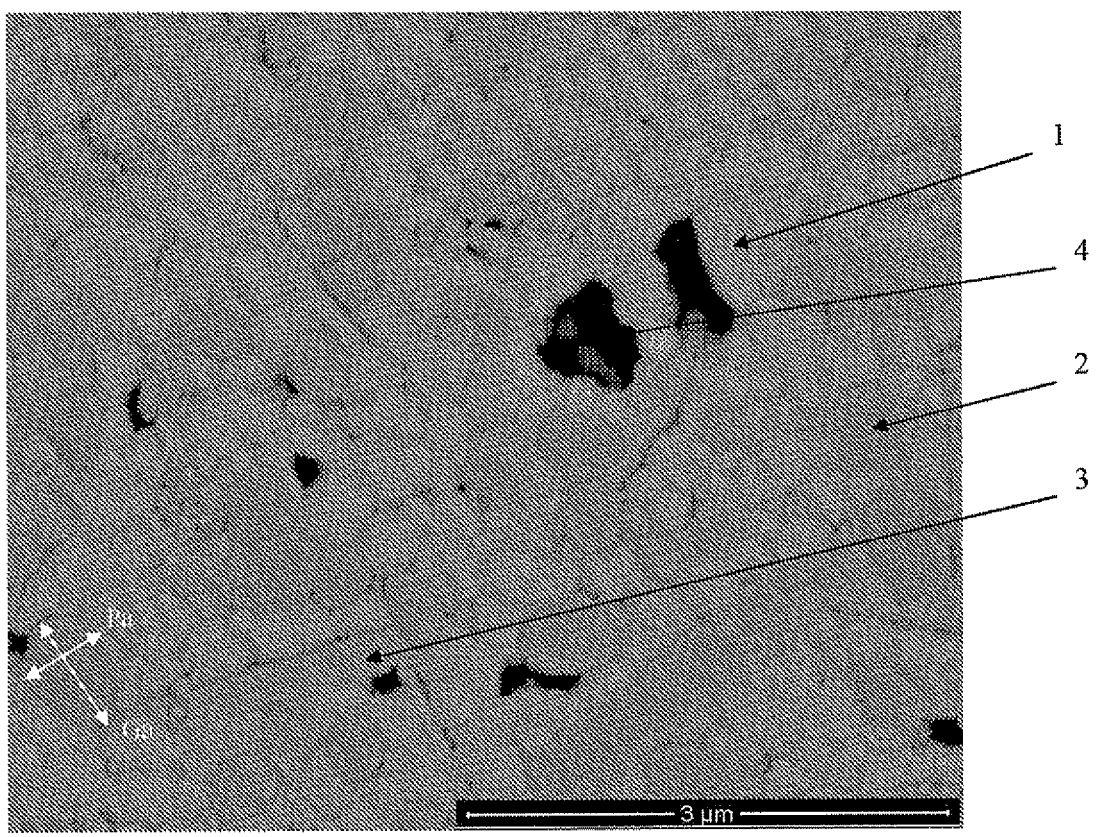

SINTERED PRODUCT BASED ON ALUMINA AND ZIRCONIA

TECHNICAL FIELD

The invention relates to a sintered product based on alumina and zirconia, in particular sintered beads, and their use in mills.

BACKGROUND OF THE INVENTION

The term "refractory products" includes fused cast products and sintered products.

In contrast to sintered products, fused cast products usually include a very substantial intergranular vitreous phase that fills an array of crystallized grains. The problems encountered by sintered products and by fused cast products in their respective applications, and the technical solutions adopted to overcome them are thus generally different. Further, because of the major differences between their production methods, a composition developed to produce a fused cast product cannot, a priori, be used as is to produce a sintered product, and vice versa.

Sintered products are obtained by mixing appropriate starting materials then shaping that green mixture and firing the resulting green body at a temperature and for a time sufficient to sinter that green body.

Depending on their chemical composition, sintered products have a variety of properties and are thus intended for a wide variety of industries.

One highly specific application is the use of sintered products, conventionally in the form of beads, as a milling medium, in particular to finely mill mineral, inorganic, or organic substances. In that application, the beads are dispersed in an aqueous medium or a solvent at a temperature that may exceed 80° C., and then they are subjected to friction by contact with the substance to be milled, by mutual contact, and by contact with the elements of the mill. Hence, the service life of the beads is directly dependent on their wear resistance in that aqueous medium or solvent.

US 2009/0036291 (or WO 2009/018024) discloses sintered beads based on zirconia and alumina that include approximately 9% to 12% of cerium oxide, $CeO_2$, and in the range 0.01% to 0.8% of calcium oxide, CaO. It compares them with $CeO_2$-TZP beads ("$CeO_2$-stabilized tetragonal zirconia polycrystals"), but considers, on the basis of historical data, that there is no need to compare them with Y-TZP beads, known for their poor performance in aqueous media.

Modifying the composition of a sintered bead, especially by incorporating a new oxide, even in a small quantity, may have very substantial consequences on its properties. It is also known that the quantity of the stabilized phase of a zirconia may be modified by heat treating or mechanically treating that zirconia.

In order to increase the yields of milling operations, the milling particles have to be ever more wear resistant, while having high resistance to degradation in a hot liquid medium, in particular when they are in contact with water at more than 80° C.; below, such conditions are termed "hydrothermal conditions".

Further, there is a constant drive towards increasing milling yield, i.e. obtaining a maximum quantity of milled material for a given cost.

One aim of the invention is to satisfy those needs, at least in part.

SUMMARY OF THE INVENTION

The invention proposes a sintered particle having the following chemical analysis, as percentages by weight:

| | |
|---|---|
| $ZrO_2$ partially stabilized with $CeO_2$ and $Y_2O_3$: | complement to 100%; |
| $Al_2O_3$: | 10%-60%; |
| additive selected from CaO, a manganese oxide, ZnO, $La_2O_3$, a praseodymium oxide, SrO, a copper oxide, $Nd_2O_3$, BaO, an iron oxide, and mixtures thereof: | 0.2%-6%; |
| the quantity of CaO being less than | 2%; |
| impurities: | <2%; |
| $CeO_2$ and $Y_2O_3$ being present in quantities such that, as molar percentages based on the sum of $ZrO_2$, $CeO_2$ and $Y_2O_3$: | |
| $CeO_2$: | 6-11 mol %; |
| and | |
| $Y_2O_3$: | 0.5-2 mol %; |
| the particle being obtained by sintering at a sintering temperature of higher than 1300° C., the sintering temperature being higher than 1400° C., preferably higher than 1425° C.: | |
| (C1) if the additive is CaO; or | |
| (C2) if the molar $CeO_2$ content is in the range 10% to 11%. | |

As can be seen in more detail in the description below, such sintered particles have excellent wear resistance, even under hydrothermal conditions.

Further, the density of said particles is relatively low. Since the weight of the particles that can be charged into a mill generally constitutes a limiting factor, the density of the sintered particles of the invention means that advantageously, a large number of said particles can be charged.

Further, they have reduced zirconia and $CeO_2$ contents. Since zirconia and cerine are expensive materials, then for a given budget, it is thus possible to produce more sintered particles and to introduce a large number of them into the mills. Thus, the sintered particles of the invention can be used to obtain a very high milling yield.

In summary, the sintered particles of the invention mean that an excellent compromise can be obtained between wear resistance under hydrothermal conditions and milling yield.

A sintered particle of the invention may also have one or more of the following optional characteristics:

- said molar quantity of $CeO_2$ is less than 10.0%, preferably less than 9.5%, and/or preferably more than 7.0%, preferably more than 7.5%, preferably more than 8.0%, or even more than 8.5%, as a molar percentage based on the sum of $ZrO_2$, $CeO_2$, and $Y_2O_3$;
- said molar quantity of $Y_2O_3$ is less than 1.9%, less than 1.7%, less than 1.5%, less than 1.2% and/or more than 0.7%, or even more than 0.8%, as a molar percentage based on the sum of $ZrO_2$, $CeO_2$, and $Y_2O_3$;
- in a particular embodiment, said molar quantity of $CeO_2$ is in the range 8.5% to 9.5% and said molar quantity of $Y_2O_3$ is in the range 0.8% to 1.2%, as molar percentages based on the sum of $ZrO_2$, $CeO_2$, and $Y_2O_3$;
- the quantity of alumina, $Al_2O_3$, is more than 15%, or even more than 20% and/or less than 55%, or even less than 50%, or even less than 40%, or even less than 35%, as a percentage by weight based on the oxides;
- the manganese oxide is selected from MnO, $MnO_2$, $Mn_2O_3$, $Mn_3O_4$, and mixtures thereof. Preferably, the manganese oxide is selected from MnO, $Mn_3O_4$ and mixtures thereof;
- the praseodymium oxide is $Pr_6O_{11}$;
- the copper oxide is CuO;
- the iron oxide is selected from FeO, $Fe_2O_3$ and mixtures thereof;
- the additive is selected from CaO, MnO, $MnO_2$, $Mn_2O_3$, $Mn_3O_4$, ZnO, $La_2O_3$, SrO, and mixtures thereof;

the additive is selected from CaO, a manganese oxide, La$_2$O$_3$, SrO, BaO and mixtures thereof, preferably from CaO, MnO, MnO$_2$, Mn$_2$O$_3$, Mn$_3$O$_4$, and mixtures thereof;

preferably, the additive is selected from CaO, MnO, Mn$_3$O$_4$, and mixtures thereof. More preferably, the additive is a mixture of CaO with MnO and/or Mn$_3$O$_4$. Preferably, the additive is selected from CaO, MnO and mixtures thereof. More preferably, the additive is a mixture of CaO and MnO;

the quantity of additive is more than 0.3%, more than 0.4%, or even more than 0.5%, or more than 0.6%, and/or less than 5%, or even less than 4%, or even less than 3%, or even less than 2.5%, or even less than 2%, or even less than 1.5%, or even less than 1%, as a percentage by weight based on the oxides;

the additive comprises CaO, the quantity of CaO being more than 0.3%, or even more than 0.4%, more than 0.5% and/or less than 1.5%, preferably less than 1%, or even less than 0.8%, or less than 0.6%, as a percentage by weight based on the oxides;

the additive comprises CaO and a second additive compound selected from MnO, MnO$_2$, Mn$_2$O$_3$, Mn$_3$O$_4$, ZnO, La$_2$O$_3$, SrO, and mixtures thereof, in particular a mixture of MnO and Mn$_3$O$_4$, the quantity of said second additive compound preferably being more than 0.1%, more than 0.2% and/or less than 4.0%, preferably less than 3.5%, or even less than 3.0%, or even less than 2.5%, or even less than 2.0%, or even less than 1.5%, or even less than 1.0%, or even less than 0.8%, or less than 0.6%, or even less than 0.5%, or less than 0.4%, or even less than 0.3%, as a percentage by weight based on the oxides;

the quantity of La$_2$O$_3$ is less than 5.2%, less than 5.0%, or even less than 4.5%, as a percentage by weight based on the oxides;

the quantity of impurities is less than 1.0%, preferably less than 0.8%, preferably less than 0.5%, or even less than 0.3%, as a percentage by weight based on the oxides. In one embodiment, the impurities are constituted by oxides;

preferably, the quantity of silica, SiO$_2$, is less than 1.5%, less than 1.0%, preferably less than 0.7%, preferably less than 0.5%, as a percentage by weight based on the oxides;

the particle is obtained by sintering at a temperature of 1320° C. or more, of more than 1400° C., of more than 1425° C., and/or less than 1550° C. In particular, it may be obtained by a method in accordance with the invention, as described below;

preferably, the mean size of the set of partially stabilized zirconia grains and the alumina grains of a sintered particle in accordance with the invention is less than 3 μm [micrometer], preferably less than 2.5 μm, or even less than 2 μm, or even less than 1.5 μm, or even less than 1 μm, or even less than 0.8 μm, and preferably more than 0.1 μm;

the sintered particle is in the form of a bead, preferably a bead with a sphericity of more than 0.7;

the sintered particle has grains with an elongate shape;

more than 80%, more than 90%, or even substantially 100% by number of the grains with an elongate shape have a generally rectilinear shape;

the number of grains with an elongate shape, measured using X-ray diffraction, is preferably more than 0.05%, preferably more than 0.10%, preferably more than 0.15%, preferably more than 0.20%, preferably more than 0.25%, preferably more than 0.3%, or even more than 0.4% and/or less than 5%, or even less than 3%, preferably less than 2%, preferably less than 1%. The measurement of the number of grains with an elongate shape is detailed in the remainder of the present description;

said grains with an elongate shape comprise the element Al and metallic cations of oxides added as an additive (Ca and/or Mn and/or Zn and/or La and/or Pr and/or Sr and/or Cu and/or Nd and or Ba and/or Fe). Said grains with an elongate shape may also comprise the element cerium (Ce). Hence, if the additive comprises CaO and MnO, the grains with an elongate Shape comprise the elements Al, Ca, Mn and Ce. The density of the sintered particle is more than 4.8 g/cm$^3$ [grams per cubic centimeter] or even more than 4.9 g/cm$^3$ and/or less than 5.5 g/cm$^3$, or even less than 5.3 g/cm$^3$;

the sintered particle is manufactured using a method that does not include a hot isostatic pressing (HIP) step;

the sintered particle is manufactured using a method comprising a drip casting step.

The invention also provides a set of particles comprising more than 90%, preferably more than 95, preferably approximately 100%, as a percentage by weight, of sintered particles in accordance with the invention.

The invention also provides a method of producing sintered particles in accordance with the invention, especially sintered beads, the method comprising the following steps in succession;

a) if necessary, milling one or more starting material powders, preferably by co-milling, in order to obtain, by mixing said powders, a particulate mixture with a median size of less than 1.0 μm;

b) preparing a suspension from said powders, the composition of the suspension being adapted so as to obtain, at the end of step f), sintered particles with a composition in accordance with that of a sintered particle of the invention;

c) hardening droplets of the suspension into the form of green particles;

d) washing;

e) drying;

f) sintering at a sintering temperature of more than 1300° C. in order to obtain sintered particles;

the sintering temperature being more than 1400° C., preferably more than 1425° C.:

(C'1) if the suspension contains no compound of Mn, Zn, Cu, Pr, Nd, Sr, La, Ba, or Fe, i.e. if the additive in the sintered particles is CaO;

(C'2) or if the suspension is such that the molar CeO$_2$ content of the sintered particles obtained at the end of step f), as a molar percentage based on the sum of ZrO$_2$, CeO$_2$, and Y$_2$O$_3$, is in the range 10% to 11%.

A method in accordance with the invention may also comprise one or more of the following optional characteristics:

carrying out a step a) for milling one or more powders of starting materials, preferably by co-milling, in order to obtain, by mixing said powders, a particulate mixture with a mean size of less than 0.6 μm, preferably less than 0.5 μm, preferably less than 0.3 μm, preferably less than 0.2 μm;

the method does not include an isostatic pressing step, in particular a hot isostatic pressing step (HIP), at least before the end of the sintering step;

the sintering temperature is less than 1550° C.;

the sintering temperature is 1320° C. or more, or more than 1400° C., or more than 1425° C.

The invention also provides the use of sintered particles of the invention or particles produced or capable of being produced using a method in accordance with the invention, as a milling medium, in particular for micro-milling. The invention also provides a mill containing sintered particles in accordance with the invention.

The invention also provides a particulate mixture comprising particles of $ZrO_2$, $Al_2O_3$, $CeO_2$, and $Y_2O_3$, and optionally particles of CaO, and/or a manganese oxide and/or ZnO and/or $La_2O_3$ and/or a praseodymium oxide and/or SrO and/or a copper oxide and/or $Nd_2O_3$ and/or BaO and/or an iron oxide and/or precursor particled of said oxides, in proportions such that, by sintering said particulate mixture, a sintered particle in accordance with the invention can be obtained.

Advantageously, such a particulate mixture is ready for use. In particular, it may be used in step b) for producing the suspension.

A particulate mixture in accordance with the invention may in particular be packed into bags.

Preferably, the median size of said particulate mixture is less than 1 µm, preferably less than 0.6 µm, preferably less than 0.5 µm, preferably less than 0.3 µm, or even less than 0.2 µm.

Definitions:
- the term "particle" means an individual piece of a solid product in a powder;
- the term "sintering" is used to describe consolidation of a granular agglomerate by heat treatment at more than 1100° C., possibly with partial or total fusion of certain of its constituents (but not all of its constituents);
- the term "bead" means a particle with a sphericity, i.e. a ratio of its smallest diameter to its largest diameter, or more than 0.6, irrespective of the manner in which said sphericity has been obtained;
- the "median size" of a set of particles, generally denoted $D_{50}$, is the size dividing the particles of said set into first and second populations that are equal in mass, said first and second populations containing only particles of a size that is respectively greater or smaller than the median size. The median size may be measured using a laser granulometer, for example;
- the "mean size" of the grains of a sintered particle is the dimension measured using a "mean linear intercept" method. A measurement method of this type is described in the ASTM E1382 method, with a correction coefficient also being applied that is a function of the grain distribution;
- the term "a manganese oxide" means one or more oxides of manganese. In particular, MnO, $Mn_2O_3$, $MnO_2$, and $Mn_3O_4$ may be mentioned;
- the term "an iron oxide" means one or more iron oxides. FeO, $Fe_2O_3$, $Fe_3O_4$ may in particular be mentioned;
- the term "a praseodymium oxide", means one or more oxides of praseodymium. $Pr_2O_3$ may in particular be mentioned;
- the term "a copper oxide", means one or more oxides of copper. CuO and $Cu_2O$ may in particular be mentioned;
- the term "impurities", means unavoidable constituents that are necessarily introduced with the starting materials. In particular, compounds belonging to the oxides, nitrides, oxynitrides, carbides, oxycarbides, carbonitrides and metallic sodium species group and other alkalis, vanadium and chromium, are impurities. Examples that may be mentioned are $Na_2O$ or MgO. In contrast, hafnium oxide is not considered to be an impurity;
- $HfO_2$ cannot be chemically dissociated from $ZrO_2$. In the chemical composition of a product comprising zirconia, "$ZrO_2$" thus denotes the total quantity of these two oxides. However, in the present invention, $HfO_2$ is not deliberately added to the starting charge. Thus, "$HfO_2$" only denotes traces of hafnium oxide, since that oxide is always naturally present in the sources of zirconia in quantities that are generally less than 2%. For the purposes of clarity, then, the quantity of zirconia and traces of hafnium oxide may interchangeably be "denoted $ZrO_2HfO_2$" or "$ZrO_2$", or "zirconia content";
- the term "precursor" of an oxide means a constituent that can supply said oxide during the production of a sintered particle in accordance with the invention. As an example, barium carbonate, $BaCO_3$, is a possible precursor of BaO;
- the term "form factor" of a grain, denoted "F", is used for the reciprocal of the ratio of the largest dimension, "Ga", of the grain to the largest dimension measured perpendicular to the direction of the dimension Ga, denoted "Pa": F=Pa/Ga. These dimensions are measured in a plane of observation of a polished section of the sintered particle, conventionally using photographic images of said section (see FIG. 1);
- the term "grain with an elongate shape" means a grain with a form factor F of less than 0.4;
- the inventors have established that a product of the invention includes, as a function of the additive, a phase of the hibonite type and/or a phase of the magnetoplumbite type and that these phases are substantially present only in the grains with an elongate shape. The measurement of the quantity of such phases may thus be used to evaluate the quantity of grains with an elongate shape. Thus, the "number of grains with an elongate shape", as a %, is defined using formula (1) below:

$$T=100*(A_{elongate\ grains})/(A_{elongate\ grains}+A_{Al2O3}+A_{ZrO2}) \quad (1)$$

in which:
- $A_{elongate\ grains}$ is the sum of the areas measured on an X-ray diffraction diagram;
  - of the peak corresponding to the <110> reflection of the hibonite type phase (ICDD file No 38-0470); and
  - of the peak corresponding to the <107> reflection of the magnetoplumbite type phase (ICDD file No 04-0704);
- $A_{Al2O3}$ is the area, measured on the same diagram, of the peak corresponding to the <012> reflection of the $Al_2O_3$ phase (ICDD file No 43-1484), measured in the 2θ angular domain in the range 24.5° to 26.5°, theoretically centered on an angle 2θ of 25.58°;
- $A_{ZrO2}$ is the area, measured on the same diagram, of the peak corresponding to the <111> reflection of the tetragonal phase of $ZrO_2$ (ICDD file No 17-0923) measured in the 2θ angular domain in the range 26.5° to 31.3°, theoretically centered on an angle 2θ of 30.19°.

The measurement of the areas $A_{elongate\ grains}$, $A_{Al2O3}$ and $A_{ZrO2}$ were carried out on the same X-ray diffraction diagram, obtained using an X'pert type diffractometer from the supplier PANalytical provided with a copper X-ray diffraction tube. The step size was adjusted to 0.008° and 600 s/step in 2θ angular ranges of 24.5° to 26.5° and 31.3° to 33.6°, to 0.033° and 300 s/step in 2θ angular ranges of 2θ 26.5° to 31.3°. A deconvolution treatment using the pseudo-Voigt function was carried out using TOPAS software from the supplier BRUKER on the amplitudes of the peaks expressed in counts per second.

The terms "peak corresponding to the <110> reflection of the hibonite type phase" and "peak corresponding to the "<107> reflection of the magnetoplumbite type phase" are used to denote the highest peak in a 2θ angular range respectively in the range 31.19° to 33.19°, and in the range 31.29° to 33.29°. These ranges are centered on 2θ angles of 32.19° and 32.29°, corresponding to the peak for a pure hibonite phase (ICDD file No 38-0470) and to a peak for a pure magnetoplumbite phase (ICDD file No 04-0704) respectively. The offset relative to these values for the angle 2θ is a function of the nature of the additive used. The nature of the additive also determines the presence of a peak corresponding to the <110> reflection of a hibonite type phase and/or a peak corresponding to the <107> reflection of a magnetoplumbite type phase.

Unless otherwise stated, all of the percentages relating to the composition of a product or relating to a starting charge are percentages by weight based on the oxides and all of the percentages of $CeO_2$ and $Y_2O_3$ are molar percentages based on the sum of $ZrO_2$, $CeO_2$, and $Y_2O_3$.

BRIEF DESCRIPTION OF THE FIGURES

Other characteristics and advantages of the invention become apparent from the following detailed description and from the accompanying drawing, in which FIG. 1 is a photograph of a polished section of a sintered particle from Example 2, in accordance with the invention, obtained after sintering at a temperature of 1375° C., this particle having undergone heat treatment at 1275° C. for 30 minutes to reveal the grain boundaries following polishing.

DETAILED DESCRIPTION

In order to produce the sintered particles of the invention, steps a) to f) described above and detailed below may be carried out.

Preferably, the powders used, in particular $ZrO_2$, alumina ($Al_2O_3$), $Y_2O_3$, $CeO_2$ powders and powdered additive each have a median size of less than 5 μm, or even less than 3 μm, less than 1 μm, less than 0.7 μm, preferably less than 0.6 μm, preferably less than 0.5 μm, preferably less than 0.3 μm, or even less than 0.2 μm. Advantageously, when each of these powders has a median size of less than 1 μm, preferably less than 0.6 μm, preferably less than 0.5 μm, preferably less than 0.3 μm, or even less than 0.2 μm, step a) is optional.

Using powders with a low median size also advantageously means that the sintering temperature can be reduced.

Preferably, the zirconia powder used has a specific surface area, calculated using the BET method, of more than 5 $m^2/g$ [square meter per gram], preferably more than 8 $m^2/g$, preferably more than 10 $m^2/g$ and less than 30 $m^2/g$. Advantageously, the sintering temperature in step f) is reduced, and the milling of step a), generally in suspension, and the taking up into suspension in step b) are thus facilitated.

In step a), the starting material powders may be milled individually or, as is preferable, they are co-milled, if they do not have the desired grain size distribution, and in particular if they have a median size of more than 1 μm, more than 0.6 μm, more than 0.5 μm, more than 0.3 μm, or more than 0.2 μm.

In step b), a suspension based on water or a solvent known as a "slip" is prepared at ambient temperature, including powders of $ZrO_2$, $Al_2O_3$, $CeO_2$, and $Y_2O_3$ and, if appropriate, one or more powders of CaO and/or a manganese oxide and/or ZnO and/or $La_2O_3$ and/or a praseodymium oxide and/or SrO and/or a copper oxide, and/or $Nd_2O_3$ and/or BaO and/or an iron oxide.

These powders may also be at least partially replaced by precursor powders for said oxides, introduced in equivalent quantities.

The inventors have discovered that adding CaO and/or a manganese oxide and/or ZnO and/or $La_2O_3$ and/or a praseodymium oxide and/or SrO and/or a copper oxide and/or $Nd_2O_3$ and/or BaO and/or an iron oxide and/or precursors of said oxides means that the quantity of grains with an elongate shape contained in the sintered particles can be increased and the mechanical performance can be improved.

The inventors have also discovered that adding a manganese oxide and/or ZnO and/or $La_2O_3$ and/or a praseodymium oxide and/or SrO and/or a copper oxide and/or $Nd_2O_3$ and/or BaO and/or an iron oxide and/or precursors of said oxides means that the sintering temperature can be reduced to below 1400° C., below 1350° C. or even to 1300° C. if the molar quantity of $CeO_2$ in the sintered particles of the invention is in the range 7% to 10%.

The powders supplying the oxides or precursors are preferably selected such that the total quantity of impurities is less than 2%, as a percentage by weight based on the oxides.

In a particular embodiment, $Y_2O_3$ is introduced in the form of a zirconia partially stabilized with yttrium oxide.

In contrast, and preferably, $CeO_2$ is only in part or not at all introduced in the form of a zirconia partially stabilized with cerium oxide.

The slip preferably has a dry matter content in the range 50% to 70% by weight.

As is well known to the skilled person, the suspension may also contain the following constituents:
- a dispersing agent in an amount of 0 to 10%, as a percentage by weight based on the dry matter;
- a viscosity stabilizing agent, or deflocculating agent, in an amount of 0 to 3%, as a percentage by weight based on the dry matter;
- a surface tension modifying agent, in an amount of 0 to 3%, as a percentage by weight based on the dry matter; and
- a gelling agent in an amount of 0 to 2%, as a percentage by weight based on the dry matter.

Dispersing agents or deflocculating agents, surface tension modifying agents, and gelling agents are well known to the skilled person. This also applies for electrolytes suitable for reaction with a given gelling agent.

Examples that may be mentioned are:
- as a dispersing agent or deflocculating agent, the sodium or ammonium polymethacrylate family, the sodium or ammonium polyacrylate family, the polyacrylic acid family (ammonium or sodium salts), or other polyelectrolytes, the citrates family, for example ammonium, the sodium phosphates family, and the carbonic acid ester family;
- as surface tension modifying agents, organic solvents such as certain aliphatic alcohols; and
- as gelling agents, certain elements of the natural polysaccharide family.

All of these elements disappear during the subsequent manufacturing steps, but a few traces may persist.

Preferably, the precursor and/or oxide powders are added to a mixture of water and dispersing/deflocculating agents in a ball mill. After agitation, water in which a gelling agent has been dissolved is added in order to obtain the suspension.

In step c), droplets of the suspension are then obtained by allowing the suspension to flow through a calibrated orifice. The droplets leaving the orifice fall into a bath of a gelling solution (electrolyte that reacts, with the gelling agent) where they harden after obtaining a substantially spherical shape.

In step d), the green particles obtained are removed from the bath, washed with water then oven dried in step e).

In step f), the green particles, which have been washed and dried, are sintered. Sintering may be carried out in a reducing, neutral, or oxidizing atmosphere. Preferably, sintering is carried out in air, in an electric oven, at atmospheric pressure.

Preferably, the sintering period is more than 1 h [hour], more than 2 h and/or less than 10 h, less than 7 h, or less than 5 h. Preferably, the sintering period is in the range 2 h to 5 h.

Sintering in step f) is carried out at a temperature of more than 1300° C. and preferably less than 1550° C.

If the suspension does not contain a compound of Mn, Zn, Cu, Pr, Nd, Sr, La, Ba, or Fe, i.e. if the additive in the sintered particles is CaO, the sintering temperature is more than 1400° C., preferably more than 1425° C.

If the suspension is such that the molar quantity of $CeO_2$ of the sintered particles obtained at the end of step f) is in the range 10% to 11%, the sintering temperature is higher than 1400° C.

The sintering temperature is preferably higher as the quantity of alumina is increased.

The sintered particles obtained are preferably in the shape of beads with a smallest diameter in the range 0.4 mm [millimeter] to 10 mm.

Surprisingly, the inventors have discovered the presence of a particular microstructure in the sintered particles of the invention. As can be seen in FIG. 1, said sintered particles comprise grains of partially stabilized zirconia 1, grains of alumina 2, grains with an elongate shape 3, which may have the shape of substantially rectilinear rods, as well as pores 4.

The form factor F of the grains with an elongate shape may be less than 0.3, or even less than 0.25.

FIG. 1 shows that there are substantially no grains with shapes intermediate between the grains with an elongate shape 3 and the other grains with a substantially spherical shape. On a curve representing the number of grains as a function of the form factor of those grains, the grains being collected into form factor classes, each having an amplitude of 0.05; there is thus a range of form factors with an amplitude of more than 0.1, or even more than 0.2, or even more than 0.3, which is hardly represented, this range separating the range corresponding to the grains with an elongate shape from the range corresponding to the other grains. The amplitude of a class or a range of form factors is the difference between the upper and lower limits of this class or this range. The term "hardly represented" means "does not include any peak exceeding 30%, 20% or even 10% of the principal peak of the range corresponding to grains with an elongate shape". In one embodiment, the grains with an elongate shape are thus represented by an isolated principal peak on said curve.

The quantity of grains with an elongate shape measured using the method described above is more than 0.05%, preferably more than 0.10%, preferably more than 0.15%, preferably more than 0.20%, preferably more than 0.25%, preferably more than 0.3%, or even more than 0.4% and/or less than 5%, or even less than 3%, preferably less, than 2%, preferably less than 1%.

Analysis has shown that these grains with an elongate shape include the element Al and the metallic cations of the oxides added as an additive (Ca and/or Mn and/or Zn and/or La and/or Pr and/or Sr and/or Cu and/or Nd and/or Ba and/or Fe), Said grains with an elongate shape may also contain the element Ce.

The inventors have also shown that more than 60%, preferably more than 80%, more preferably more than 90% of the volume of the zirconia in the sintered particles of the invention is in the tetragonal phase.

$CeO_2$ and $Y_2O_3$ act to stabilize the zirconia, but may also be present outside it.

EXAMPLES

The following non-limiting examples are given with the aim of illustrating the invention.

Sintered beads were prepared from a source of zirconia (specific surface area of the order of 8 $m^2/g$; median size <5 μm), a source of $CeO_2$ (median size <10 μm), a source of $Y_2O_3$ (median size <20 μm), a source of alumina (median size <5 μm) and, as a function of the example carried out, a source of oxides of manganese, principally in the $Mn_3O_4$ form ($D_{90}$ less than 44 μm) and also containing MnO. The purity of the sources of zirconia and $CeO_2$ was more than 99%. The purity of the source of manganese oxides, expressed in the form MnO, was more than 88%. These powders were mixed then co-milled in a moist medium until a mixture with a fine grain size was obtained (median size <0.3 μm). The mixture was then dried.

An aqueous suspension comprising, as percentages by weight of dry matter, 7.5% of a polyacrylic type dispersing agent, 1% of a carbonic acid ester type deflocculating agent (viscosity stabilizer), and 1% of a gelling agent, namely a polysaccharide from the alginate family, was then prepared from said mixture.

A ball mill was used for this preparation in order to obtain good homogeneity of the suspension: a solution containing the gelling agent was formed first. Then in succession, the optional sources of manganese, the alumina powder, the $ZrO_2$ powder, the $CeO_2$ powder, the $Y_2O_3$ powder, and the dispersing agent were added to the water. The solution containing the gelling agent was then added. The mixture obtained was agitated for 8 hours. Next, the deflocculating agent was added and the mixture was agitated for 0.5 hours. The particle size was monitored by sedigraphy using a Sedigraph 5100 supplied by Micromeritics® (median size c 0.5 μm) and water was added in a predetermined quantity to obtain an aqueous suspension with 61% dry matter and a viscosity, measured using a Brookfield viscosimeter, of less than 8500 cP [centipoise]. The pH of the suspension was then approximately 9.

The suspension was forced through a calibrated hole at a flow rate that would allow beads of approximately 1.2 mm to 1.4 mm following sintering in the context of the present example to be obtained. The droplets of suspension fell into a gelling bath based on an electrolyte, a divalent or trivalent cation salt that reacts with the gelling agent. The green beads were collected, washed to eliminate excess reagents, then dried at 90° C. to eliminate moisture. The beads were then transferred into a sintering furnace where they were heated at a rate of 100° C./h to the desired sintering temperature. At the end of a constant temperature stage of 4 h at the desired sintering temperature, the temperature was dropped by natural cooling.

Two series of tests were carried out on sintered beads with various compositions and obtained using the method described above. In the first series of tests, the sintering temperature was kept constant at 1375° C. and the influence of the composition of the beads on their wear resistance independently of the sintering temperature was observed. In the second series of tests, the sintering temperature was modified in order to observe its influence on the wear resistance of the various compositions used.

Measurement Protocols

The density of the sintered particles was measured by means of helium pycnometry (AccuPyc 1330 from Micromeritics®).

In order to determine the "planetary" wear resistance, 20 mL [milliliter] (volume measured using a graduated tube) of sintered particles to be tested with a size in the range 1.25 mm to 1.4 mm (selected by screening) were weighed (mass $m_0$) and introduced into 4 bowls coated with dense sintered alumina containing 125 mL of a rapid planetary mill of type PM400 from RETSCH. 2.2 g [gram] of silicon carbide from the supplier Presi (with a median size D50 of 23 μm) and 40 mL of water were introduced into one of the bowls. The bowl was closed and rotated (planetary motion) at 400 rpm [revolutions per minute], reversing the direction of rotation every minute for 1 h30. The contents of the bowl were then washed over a 100 μm sieve in order to remove the residual silicon carbide as well as debris caused by wear during milling. After screening over a 100 μm sieve, the sintered particles were oven dried at 100° C. for 3 h then weighed (mass m).

The planetary wear, expressed as a percentage, is given by the following formula:

$$100(m_0-m)/m_0$$

The mean grain size of the sintered particles was measured using the "Mean Linear Intercept" method. A method, of that type is described in standard ASTM E1382. In that standard, analysis lines are traced on images of particles, then lengths termed "intercepts" are measured along each analysis line between two consecutive grain boundaries cutting said analysis is line.

Next, the mean length "l'" of the intercepts "I" was determined.

For the tests below, the intercepts were measured on images, obtained by scanning electron microscopy, of sections of particles, said sections having been polished to obtain a mirror surface then heat treated at a temperature 100° C. lower than the sintering temperature to reveal the grain boundaries. The magnification used to take the images was selected in order to view approximately 100 grains on one image. 5 images were produced per particle.

The median size "d" of the grains of a sintered particle is given by the relationship:

$$d=1.56 \times l'$$

This formula is derived from formula (13) of "Average Grain Size in Polycrystalline Ceramics", M. I. Mendelson, J. Am. Cerm. Soc. Vol. 52, No. 8, pp 443-446.

The specific surface area was measured using the BET (Brunauer Emmet Teller) method as described in the Journal of the American Chemical Society 60 (1938), pages 309 to 316.

The inventors consider that a small change in the monoclinic zirconia content and the wear resistance following autoclaving at 140° C. for 24 h corresponds to good wear resistance under hydrothermal conditions. Under such circumstances, the last column of Table 2 shows that the test product is stable under hydrothermal conditions.

Tables 1 and 2 below summarize the results obtained.

TABLE 1

| | Chemical analysis (% by weight) | | | | | | | | | |
|---|---|---|---|---|---|---|---|---|---|---|
| | Base, sum of | | | Partly stabilized | Additives | | | | Planetary wear (%) | |
| | $ZrO_2 + CeO_2 + Y_2O_3$ (% molar) | | | | | Manganese oxides; expressed, | | | Sintering temperature (° C.) | |
| Ex | $ZrO_2$ | $CeO_2$ | $Y_2O_3$ | $ZrO_2$ | $Al_2O_3$ | as MnO | CaO | Impur. | 1320° C. | 1350° C. |
| 1(*) | 88 | 12 | — | 98 | 0.6 | 0.6 | 0.4 | 0.4 | 1.55 | |
| 2 | 90 | 9 | 1 | 73.86 | 24.50 | 0.24 | 0.42 | 0.98 | 2.7 | 1.5 |
| 3 | 90 | 9 | 1 | 74.35 | 24.50 | — | 0.34 | 0.81 | 28.2 | 11.6 |
| 4 | 90 | 9 | 1 | 74.14 | 24.30 | 0.48 | 0.31 | 0.77 | — | 2.0 |
| 5 | 88.62 | 10.79 | 0.59 | 74.32 | 24.30 | 0.40 | 0.35 | 0.63 | — | — |
| 6 | 88.62 | 10.79 | 0.59 | 74.35 | 24.00 | 0.40 | 0.86 | 0.39 | — | — |
| 7 | 90 | 9 | 1 | 73.79 | 24.40 | 0.92 | 0.46 | 0.43 | — | — |
| 8 | 90 | 9 | 1 | 72.46 | 24.10 | 2.47 | 0.43 | 0.54 | — | 1.4 |
| 9 | 90 | 9 | 1 | 72.42 | 24.20 | 2.43 | 0.80 | 0.15 | — | — |
| 10(*) | 90 | 9 | 1 | 71.55 | 23.10 | 0.48 | 4.53 | 0.34 | — | — |
| 11(*) | 92.8 | 2.6 | 4.6 | 74.17 | 24.8 | 0.30 | 0.31 | 0.42 | — | 11.8 |

| | Planetary wear (%) Sintering temperature (° C.) | | Density (g/cm³) Sintering temperature (° C.) | | | | Stability under hydrothermal conditions (treatment in autoclave |
|---|---|---|---|---|---|---|---|
| Ex | 1375° C. | 1425° C. | 1320° C. | 1350° C. | 1375° C. | 1425° C. | at 140° C. for 24 h) |
| 1(*) | 1.55 | | 6.20 | | | | Yes |
| 2 | 0.9 | 0.8 | 5.44 | 5.34 | 4.98 | 5.14 | Yes |
| 3 | 5.6 | 1.4 | 5.49 | 5.49 | 5.46 | 5.03 | Yes |
| 4 | 1.0 | 0.9 | — | 5.40 | 5.01 | 5.19 | Yes |
| 5 | 6.7 | 0.9 | — | 5.47 | 5.48 | 5.07 | Yes |
| 6 | 5.3 | — | — | — | 5.44 | — | Yes |
| 7 | 2.3 | — | — | — | 5.43 | — | Yes |
| 8 | 1.2 | 1.4 | — | 5.32 | 5.09 | 5.32 | Yes |
| 9 | 1.9 | — | — | — | — | — | Yes |
| 10(*) | 21.6 | — | — | — | 5.19 | — | Yes |
| 11(*) | 5.4 | — | — | 5.37 | 5.37 | — | No |

(*)examples not in accordance with the invention

TABLE 2

| | No of grains with an elongate shape (%) Sintering temperature (° C.) | | | |
|---|---|---|---|---|
| Ex | 1320° C. | 1350° C. | 1375° C. | 1425° C. |
| 1 (*) | | Nd (**) | | |
| 2 | 0.05 | — | 0.27 | 0.38 |
| 3 | Nd (**) | 0.07 | 0.08 | 0.14 |
| 4 | — | — | 0.29 | 0.42 |

TABLE 2-continued

| | No of grains with an elongate shape (%) Sintering temperature (° C.) | | | |
|---|---|---|---|---|
| Ex | 1320° C. | 1350° C. | 1375° C. | 1425° C. |
| 5 | — | — | 0.30 | 0.45 |
| 6 | — | — | 0.34 | — |
| 7 | — | — | 0.49 | — |
| 8 | — | 1.97 | 1.54 | 2 |
| 10 (*) | — | — | 1.50 | |
| 11 (*) | — | Nd () | Nd () | — |

(*) example not in accordance with the invention
(**) Nd: not detectable

The inventors consider that there is a good compromise between the milling yield and the planetary wear when:
the planetary wear is less than or equal to 3%; and
the density is in the range 4.5 g/cm$^3$ to 5.9 g/cm$^3$.

Preferably, the planetary wear is less than 2.5%, preferably less than 2%, or even less than 1.5%, or even less than 1.0%, and/or the density is in the range 4.8 g/cm$^3$ to 5.5 g/cm$^3$, or even in the range 4.9 g/cm$^3$ to 5.3 g/cm$^3$.

For Example 3, containing no additive compound other than CaO, a sintering temperature of more than 1400° C. was necessary in order to reach a wear resistance that satisfied the conditions of the compromise. Adding an additive compound other than CaO is thus advantageous, optionally in addition to CaO.

A comparison of Examples 3 and 4 in particular shows the importance of the presence of manganese oxides for a given CaO content.

Examples 5 and 6, with a molar $CeO_2$ content of more than 10%, show the necessity for a sintering temperature of more than 1400° C. in order to achieve a wear resistance satisfying the conditions of the compromise. The preferred ranges for $CeO_2$ in accordance with the invention mean that the sintering temperature can advantageously be limited. These examples also demonstrate the positive effect of a limited increase in the CaO content.

Example 10, with a CaO content of 4.53%, illustrates the importance of limiting the CaO content.

Example 11, with $CeO_2$ and $Y_2O_3$ contents that are not within the ranges for the products of the invention, was not sufficiently resistant to wear under hydrothermal conditions.

Example 2 is the example that is the most preferred.

Table 2 also shows a correlation between the performance obtained and the proportion of grains with an elongate shape.

As is clearly shown herein, the invention provides a sintered particle having a good compromise between planetary wear resistance and density, even under hydrothermal conditions.

Clearly, the invention is not limited to the examples and embodiments described above. In particular, other gelling systems may be suitable for producing a ceramic bead of the invention. Thus, U.S. Pat. No. 5,466,400, FR 2 842 438, and U.S. Pat. No. 4,063,856 describe applicable sol-gel methods. FR 2 842 438 and U.S. Pat. No. 4,063,856 use a gelling system close to that described above (based on alginate), while U.S. Pat. No. 5,466,400 describes a very different gelling system.

The method described in US 2009/0036291 and methods of forming beads by pressing or by granulation may also be envisaged.

The invention claimed is:

1. A sintered particle having a ratio between its smallest diameter and its largest diameter of more than 0.6 and having the following chemical analysis, as percentages by weight:
   $Al_2O_3$: 10%-60%;
   additive selected from CaO, a manganese oxide, $La_2O_3$, SrO, BaO and mixtures thereof: 0.2%-6%;
   the quantity of CaO being less than 2%;
   impurities: <2%;
   $ZrO_2$ partially stabilized with $CeO_2$ and $Y_2O_3$: complement to $Al_2O_3$, additive, and impurities, up to 100%;
   the zirconia being stabilized with $CeO_2$ and $Y_2O_3$ present in molar quantities, as molar percentages based on the sum of $ZrO_2$, $CeO_2$ and $Y_2O_3$, such that:
   $CeO_2$: 6 mol %-11 mol %; and
   $Y_2O_3$: 0.5 mol %-2 mol %;
   the particle being obtained by sintering at a sintering temperature higher than 1300° C., the sintering temperature being higher than 1400° C. if the additive is CaO or if the molar $CeO_2$ content is in the range 10% to 11%.

2. The sintered particle according to claim 1, wherein the molar $CeO_2$ content is less than 10% and more than 7%.

3. The sintered particle according to claim 2, wherein the molar $CeO_2$ content is less than 9.5% and more than 8.5%.

4. The sintered particle according to claim 1, wherein the molar $Y_2O_3$ content is less than 1.2% and more than 0.8%.

5. The sintered particle according to claim 1, wherein the alumina, $Al_2O_3$, content is more than 15% and less than 55%, as a percentage by weight based on the oxides.

6. The sintered particle according to claim 5, wherein the alumina, $Al_2O_3$, content is more than 20% and less than 40%, as a percentage by weight based on the oxides.

7. The sintered particle according to claim 1, wherein the additive is selected from CaO, MnO, $MnO_2$, $Mn_2O_3$, $Mn_3O_4$, $La_2O_3$, SrO, and mixtures thereof.

8. The sintered particle according to claim 7, wherein the additive is selected from CaO, MnO, $Mn_3O_4$ and mixtures thereof.

9. The sintered particle according to claim 8, wherein the additive is a mixture of CaO with MnO and/or $Mn_3O_4$.

10. The sintered particle according to claim 1, wherein the additive content is more than 0.4% and less than 5%, as a percentage by weight based on the oxide.

11. The sintered particle according to claim 10, wherein the quantity of additive is more than 0.5% and less than 1%, as a percentage by weight based on the oxide.

12. The sintered particle according to claim 1, wherein the quantity of additive is less than 4.0%, as a percentage by weight based on the oxide.

13. The sintered particle according to claim 1, wherein the additive comprises CaO, the quantity of CaO being more than 0.3% and less than 1.5%, as a percentage by weight based on the oxide.

14. The sintered particle according to claim 1, wherein the quantity of impurities is less than 1%.

15. The sintered particle according to claim 1, in the form of a bead with a sphericity of more than 0.7.

16. The sintered particle according to claim 1, having grains with an elongate shape, the quantity of grains with an elongate shape, measured by X-ray diffraction, being in a range 0.05% to 5%.

17. The sintered particle according to claim 1, wherein more than 80% by volume of the zirconia is in the tetragonal phase.

18. The sintered particle according to claim 1, produced by a method comprising a drip casting step.

19. A particulate mixture comprising basis particles of $ZrO_2$, $Al_2O_3$, $CeO_2$, $Y_2O_3$, and an additive selected from CaO and/or an oxide of manganese and/or $La_2O_3$ and/or SrO and/or BaO and/or precursor particles of the oxides, in proportions such that, by sintering the mixture of the basis particles, and/or precursor particles, a sintered particle according to claim 1 is obtained.

20. The particulate mixture according to claim 19, wherein the median size is less than 1 μm.

21. The particulate mixture according to claim 20, wherein the median size is less than 0.3 μm.

22. A mill containing sintered particles according to claim 1.

23. A milling mixture medium comprising the sintered particles according to claim 1.

* * * * *